United States Patent
Muto

(10) Patent No.: US 8,145,006 B2
(45) Date of Patent: Mar. 27, 2012

(54) IMAGE PROCESSING APPARATUS AND IMAGE PROCESSING METHOD CAPABLE OF REDUCING AN INCREASE IN CODING DISTORTION DUE TO SHARPENING

(75) Inventor: Yasuhiko Muto, Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/896,205

(22) Filed: Oct. 1, 2010

(65) Prior Publication Data

US 2011/0229046 A1 Sep. 22, 2011

(30) Foreign Application Priority Data

Mar. 17, 2010 (JP) .................................. 2010-061376

(51) Int. Cl.
*G06K 9/40* (2006.01)
(52) U.S. Cl. ....... 382/263; 382/233; 382/254; 358/3.26; 358/3.27
(58) Field of Classification Search .................. 382/254, 382/263; 348/252; 358/3.26–3.27
See application file for complete search history.

(56) References Cited

U.S. PATENT DOCUMENTS

| | | | | |
|---|---|---|---|---|
| 6,175,596 | B1 * | 1/2001 | Kobayashi et al. | 375/240.27 |
| 2002/0085768 | A1 * | 7/2002 | Yokose et al. | 382/248 |
| 2002/0085769 | A1 * | 7/2002 | Yokose et al. | 382/250 |
| 2003/0007693 | A1 * | 1/2003 | Yokose et al. | 382/233 |
| 2003/0053708 | A1 * | 3/2003 | Kryukov et al. | 382/261 |
| 2005/0285977 | A1 * | 12/2005 | Nako et al. | 348/672 |
| 2006/0098743 | A1 * | 5/2006 | Nakajima et al. | 375/240.27 |
| 2008/0310516 | A1 * | 12/2008 | Kobayashi et al. | 375/240.24 |
| 2009/0214113 | A1 * | 8/2009 | Oztan et al. | 382/167 |
| 2009/0268064 | A1 * | 10/2009 | Mizuno et al. | 348/252 |
| 2010/0067574 | A1 * | 3/2010 | Knicker et al. | 375/240.12 |
| 2010/0316292 | A1 * | 12/2010 | O'Hara et al. | 382/168 |
| 2011/0063516 | A1 * | 3/2011 | Muto | 348/625 |
| 2011/0229028 | A1 * | 9/2011 | Nagai | 382/168 |
| 2011/0229046 | A1 * | 9/2011 | Muto | 382/233 |

FOREIGN PATENT DOCUMENTS

| | | |
|---|---|---|
| JP | 09-081104 | 3/1997 |
| JP | 10-229546 | 8/1998 |
| JP | 2005-142891 | 6/2005 |
| JP | 2005-354379 | 12/2005 |
| JP | 2006-013735 | 1/2006 |
| JP | 2006-135571 | 5/2006 |
| JP | 2008-311951 | 12/2008 |
| JP | 2009-201103 | 9/2009 |

OTHER PUBLICATIONS

Japanese Patent Application No. 2010-061376; Notice of Reasons for Rejection; Mailed Jan. 18, 2011 (English translation).

* cited by examiner

*Primary Examiner* — Jason M Repko
*Assistant Examiner* — Gandhi Thirugnanam
(74) *Attorney, Agent, or Firm* — Blakely, Sokoloff, Taylor & Zafman LLP

(57) ABSTRACT

According to one embodiment, an image processing apparatus includes a decoder, an acquisition module, a sharpening module, and a controller. The decoder decodes an encoded image to obtain a decoded image. The acquisition module acquires quantization information indicating the accuracy of quantization upon generating the encoded image. The sharpening module performs sharpening on the decoded image. The controller controls the effect of the sharpening based on the quantization information such that the effect of the sharpening is reduced as the accuracy decreases.

10 Claims, 8 Drawing Sheets

FIG.3

| | ITEM | CONTENTS |
|---|---|---|
| CONDITION | QUANTIZATION STEP (QUANTIZATION SCALE) | SMALL ←————————→ LARGE |
| CONTROL | CORING PROCESS | LOW ←————————→ HIGH |
| | NON-LINEAR PROCESS | HIGH LEVEL ←————————→ LOW LEVEL |
| | GAIN | LARGE ←————————→ SMALL |
| EFFECT | SHARPENING | HIGH ←————————→ LOW |

FIG.4A

| | ITEM | CONTENTS |
|---|---|---|
| CONDITION | ENCODING SCHEME | H.264/MPEG-4 AVC ←——————→ MPEG-2 |
| CONTROL | CORING PROCESS | LOW ←——————————————→ HIGH |
| | NON-LINEAR PROCESS | HIGH LEVEL ←————————→ LOW LEVEL |
| | GAIN | LARGE ←——————————————→ SMALL |
| EFFECT | SHARPENING | HIGH ←——————————————→ LOW |

FIG.4B

| | ITEM | CONTENTS |
|---|---|---|
| CONDITION | PICTURE TYPE | B-, P-PICTURE ←——————→ I-PICTURE |
| CONTROL | CORING PROCESS | LOW ←——————————————→ HIGH |
| | NON-LINEAR PROCESS | HIGH LEVEL ←————————→ LOW LEVEL |
| | GAIN | LARGE ←——————————————→ SMALL |
| EFFECT | SHARPENING | HIGH ←——————————————→ LOW |

FIG.4C

| | ITEM | CONTENTS |
|---|---|---|
| CONDITION | FREQUENCY HISTOGRAM | LOW ←——————————————→ HIGH |
| CONTROL | CORING PROCESS | LOW ←——————————————→ HIGH |
| | NON-LINEAR PROCESS | HIGH LEVEL ←————————→ LOW LEVEL |
| | GAIN | LARGE ←——————————————→ SMALL |
| EFFECT | SHARPENING | HIGH ←——————————————→ LOW |

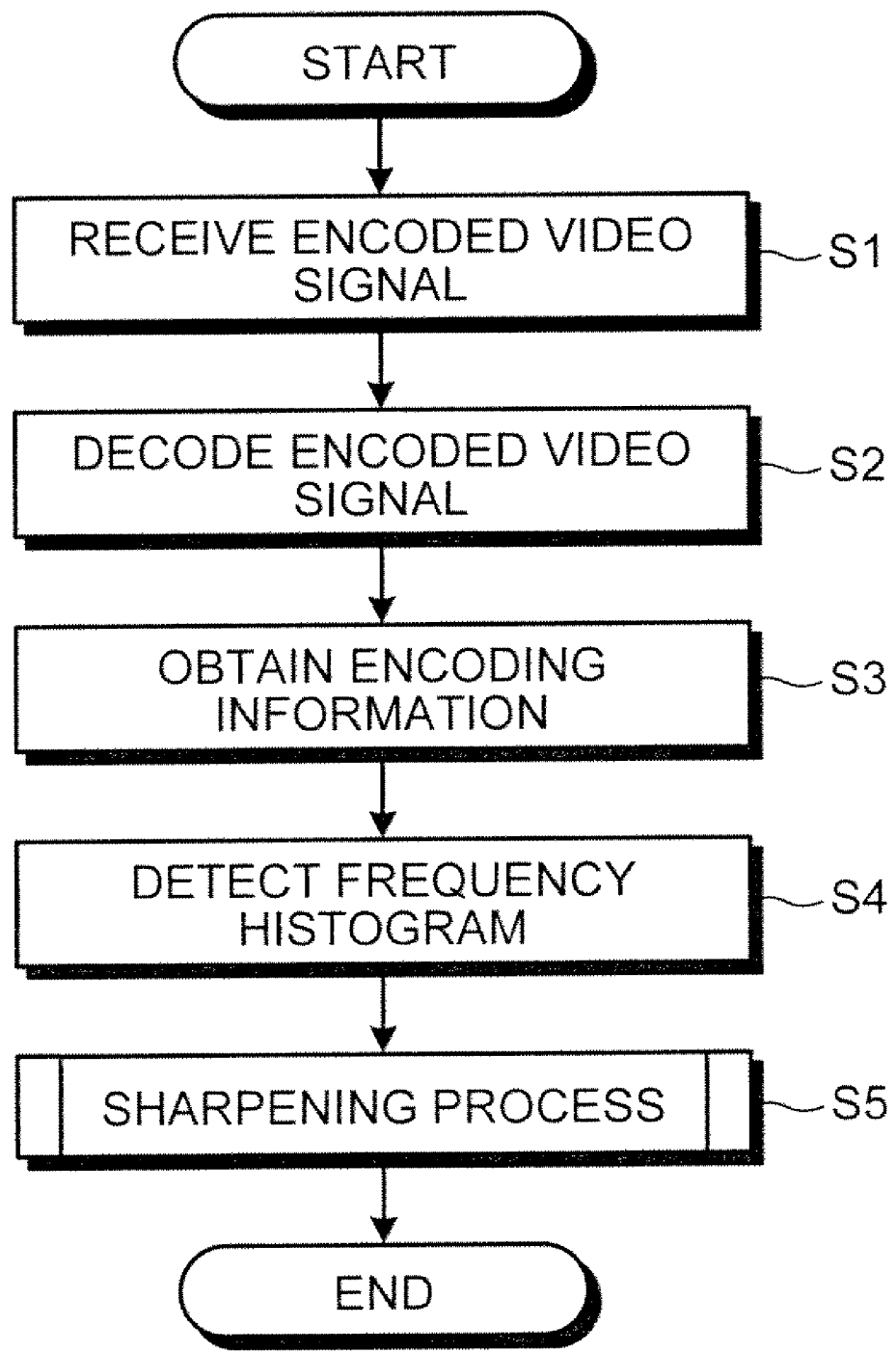

IMAGE PROCESSING APPARATUS AND IMAGE PROCESSING METHOD CAPABLE OF REDUCING AN INCREASE IN CODING DISTORTION DUE TO SHARPENING

CROSS-REFERENCE TO RELATED APPLICATIONS

This application is based upon and claims the benefit of priority from Japanese Patent Application No. 2010-061376, filed Mar. 17, 2010, the entire contents of which are incorporated herein by reference.

FIELD

Embodiments described herein relate generally to an image processing apparatus and an image processing method.

BACKGROUND

Generally, a moving image is encoded when transmitted or stored to increase the transmission efficiency and the compression efficiency. Upon receipt of the encoded moving image, the receiving side decodes the image, and performs sharpening on the decoded image to reproduce it. If an encoded moving image is decoded and sharpened in this manner, the sharpening may increase the coding distortion and may result in image quality degradation.

For example, Japanese Patent Application Publication (KOKAI) No. H9-81104 discloses a conventional technology for preventing such image quality degradation. According to the conventional technology, a gain and a frequency for contour enhancement can be varied depending on the quantization level to prevent the image quality degradation.

In the conventional technology, only the gain and the frequency for contour enhancement are varied. This is not sufficient to reduce the sharpening effect, and cannot sufficiently reduce an increase in the coding distortion due to the sharpening.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 3 is an exemplary conceptual diagram of sharpening process performed by a sharpening controller in the embodiment;

FIGS. 4A to 4C are exemplary conceptual diagrams of sharpening process performed by the sharpening controller in the embodiment;

FIG. 5 is an exemplary flowchart of the operation of the image processing apparatus in the embodiment;

DETAILED DESCRIPTION

Various embodiments will be described hereinafter with reference to the accompanying drawings. In general, according to one embodiment, an image processing apparatus comprises a decoder, an acquisition module, a sharpening module, and a controller. The decoder is configured to decode an encoded image to obtain a decoded image. The acquisition module is configured to acquire quantization information indicating the accuracy of quantization upon generating the encoded image. The sharpening module is configured to perform sharpening on the decoded image. The controller is configured to control the effect of the sharpening based on the quantization information such that the effect of the sharpening is reduced as the accuracy decreases.

According to another embodiment, there is provided an image processing method applied to an image processing apparatus configured to decode an encoded image and sharpen the image. The image processing method comprises: a decoder decoding the encoded image to obtain a decoded image; an acquisition module acquiring quantization information indicating the accuracy of quantization upon generating the encoded image; a sharpening module performing sharpening on the decoded image; and a controller controlling the effect of the sharpening based on the quantization information such that the effect of the sharpening is reduced as the accuracy decreases.

A description will now be given of an image processing apparatus and an image processing method according to an embodiment. In the embodiment, a video (moving image) signal encoded by a predetermined encoding scheme is decoded and sharpened to a fine video signal to be output. The image processing apparatus and the image processing method of the embodiment may be applied to recording on a large-capacity storage medium such as a television (TV) receiver, a hard disk drive (HDD), and digital versatile disk (DVD), and reproduction of recorded data on a recorder/player that reproduces recorded data such as a tuner and a set top box.

Figure 1:
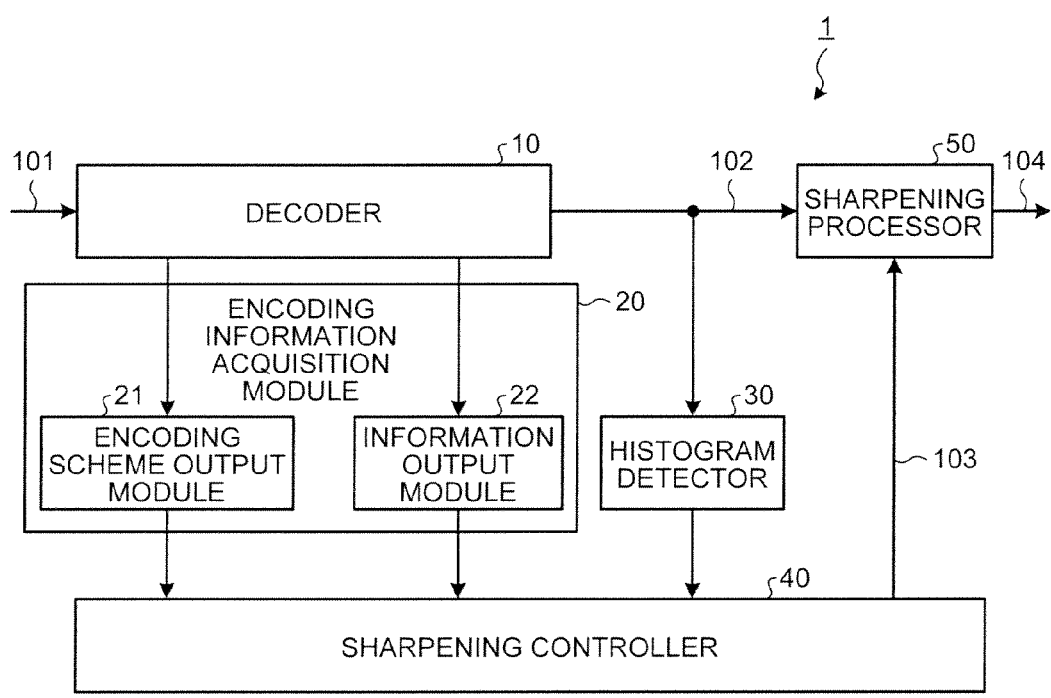
FIG. 1 is an exemplary block diagram of an image processing apparatus according to an embodiment.

FIG. 1 is a block diagram of an image processing apparatus 1 according to the embodiment. As illustrated in FIG. 1, the image processing apparatus 1 comprises a decoder 10, an encoding information acquisition module 20, a histogram detector 30, a sharpening controller 40, and a sharpening processor 50. The elements of the image processing apparatus 1 may be formed of chips such as microcontrollers, respectively, or may be formed of a single chip. The elements of the image processing apparatus 1 may also be implemented by computer programs that the central processing unit (CPU) loads from a read only memory (ROM) or the like into the work area of a random access memory (RAM) and sequentially executes.

The decoder 10 decodes an encoded video signal 101 encoded by a predetermined encoding scheme. The decoder 10 may perform H.264/MPEG-4 advanced video coding (AVC) decoding, MPEG-2 decoding, or the like. The decoder 10 outputs the video signal thus decoded to the histogram detector 3 and the sharpening processor 50 as a decoded video signal 102. Besides, the decoder 10 acquires encoding information applied to encoding of the encoded video signal 101 when decoding it and outputs the encoding information to the encoding information acquisition module 20.

More specifically, the encoding information includes information related to the encoding scheme such as H.264/MPEG-4 AVC, MPEG-2, or the like, the picture type of a field or a frame, quantization information, and the like. The picture type indicates group of pictures (GOP) including I-picture, P-picture, and B-picture that constitutes the minimum structure of a video image defined by MPEG. The quantization information indicates the accuracy of quantization upon encoding and may be, for example, quantization step in a field or a frame, average macroblock quantization scale in a field or a frame, and the like.

The encoding information acquisition module 20 comprises an encoding scheme output module 21 and an information output module 22, and receives the encoding information output from the decoder 10. The encoding information is received as being once classified for the encoding scheme output module 21 or the information output module 22. More specifically, if the encoding information is related to the encoding scheme, it is received as being classified for the encoding scheme output module 21. On the other hand, if the encoding information is related to the picture type, the quantization information, or the like, it is received as being classified for the information output module 22.

The encoding scheme output module 21 receives the type of encoding scheme applied to the encoded video signal 101 such as H.264/MPEG-4 AVC, MPEG-2, or the like. The encoding scheme output module 21 outputs the type of encoding scheme to the sharpening controller 40. The information output module 22 receives the picture type and the quantization information with respect to each field or frame of the encoded video signal 101. The information output module 22 outputs the picture type and the quantization information to the sharpening controller 40.

The histogram detector 30 detects a frequency histogram with respect to each field or frame of the decoded video signal 102, in which the horizontal axis represents frequency component while the vertical axis represents the appearance count (the number of pixels). The histogram detector 30 outputs the detected frequency histogram to the sharpening controller 40. The detection of the frequency histogram enables the sharpening controller 40 to determine the number of existing pixels corresponding to each frequency component in the field or frame of the decoded video signal 102. That is, the sharpening controller 40 can determine whether the field or frame is main formed of low frequency pixels or high frequency pixels.

The sharpening controller 40 controls the intensity of the effect of sharpening in the sharpening processor 50 according to the type of encoding scheme output from the encoding scheme output module 21, the picture type or the quantization information output from the information output module 22, and the frequency histogram output from the histogram detector 30. More specifically, the sharpening controller 40 outputs a control signal 103 corresponding to the output of the encoding scheme output module 21, the information output module 22, and the histogram detector 30 to control the intensity of the effect of sharpening in the sharpening processor 50 (the details will be described later).

The sharpening processor 50 performs the image processing (sharpening) on the decoded video signal 102 to increase the resolution, thereby generating a video signal 104 with a higher resolution than that of the decoded video signal 102. For example, the sharpening processor 50 generates the video signal 104 with a high-definition (HD) resolution of 1920× 1080 from the decoded video signal 102 with a resolution of 1440×1080. Besides, the sharpening processor 50 performs sharpening using the control signal 103 from the sharpening controller 40.

The term "sharpening" as used herein refers to a process to enhance a predetermined signal contained in an input video signal to generate a video signal with a higher resolution than that of the input video signal. The sharpening includes a process to perform only enhancement without a change in the resolution of a video signal before and after the sharpening.

Figure 2:
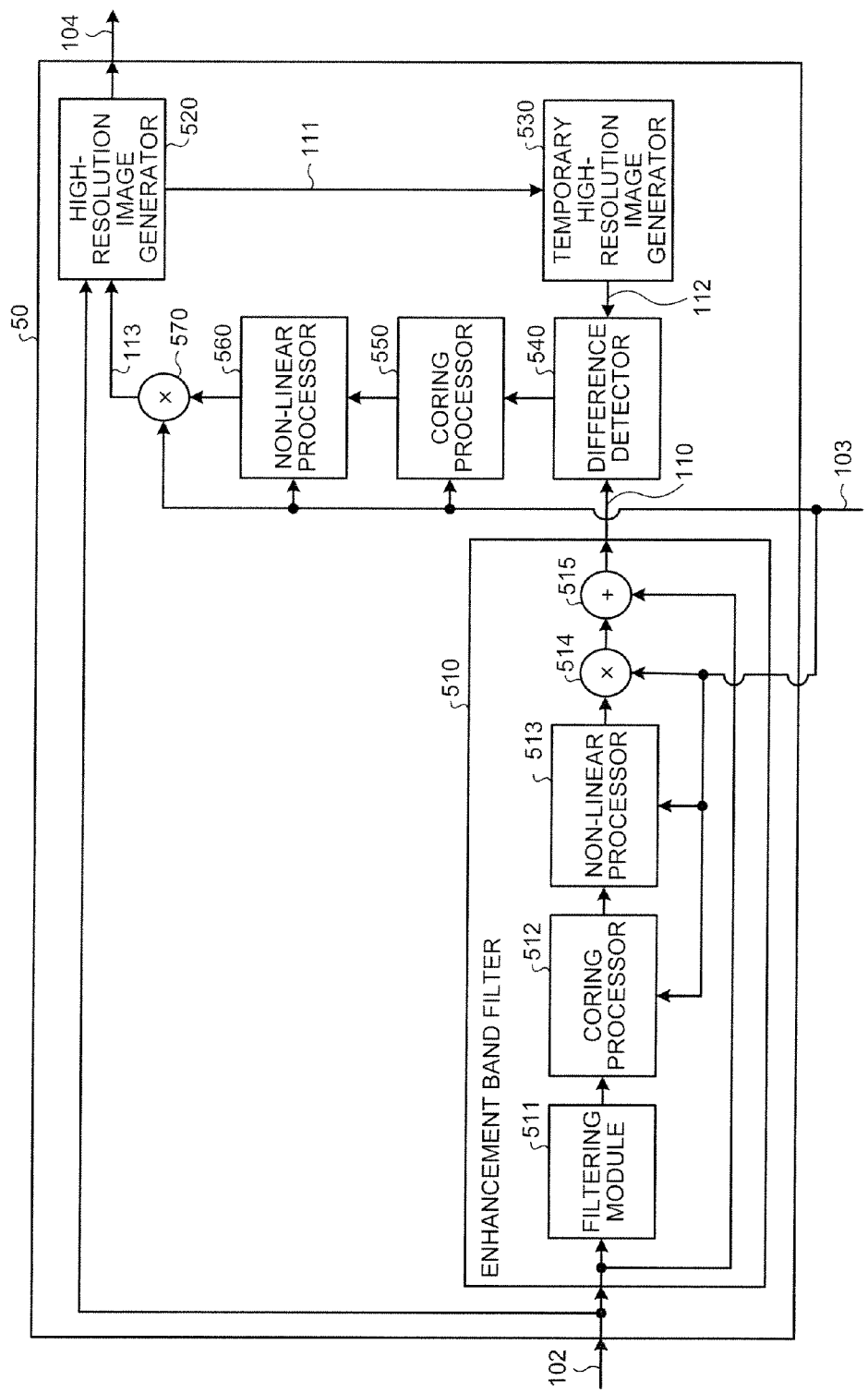
FIG. 2 is an exemplary block diagram of a sharpening processor in the embodiment.

The configuration of the sharpening processor 50 will be described with reference to FIG. 2. FIG. 2 is a block diagram of the sharpening processor 50. As illustrated in FIG. 2, the sharpening processor 50 comprises an enhancement band filter 510, a high-resolution image generator 520, a temporary high-resolution image generator 530, a difference detector 540, a coring processor 550, a non-linear processor 560, and parameter adjuster 570.

The enhancement band filter 510 extracts a video signal of a predetermined band contained in the input decoded video signal 102 and enhances it. The enhancement band filter 510 then adds the enhanced video signal to the decoded video signal 102 and outputs it to the difference detector 540 as a video signal 110. That is, the enhancement band filter 510 is an unsharp mask that enhances a video signal of a predetermined band contained in the input decoded video signal 102. For example, if the enhancement band filter 510 is an unsharp mask that enhances a video signal of a high frequency band, the enhancement band filter 510 extracts a texture portion from among the texture portion, an edge portion, and a plain portion contained in the decoded video signal 102. The texture portion includes a fine pattern and the like, the edge portion includes a line, a boundary, and the like, and the plain portion includes a background and the like. The enhancement band filter 510 outputs the video signal 110 in which the texture portion is enhanced.

More specifically, the enhancement band filter 510 comprises a filtering module 511, a coring processor 512, a non-linear processor 513, a gain adjuster 514, and a corrector 515. The filtering module 511 extracts a video signal of a predetermined band from the input decoded video signal 102 and outputs it to the coring processor 512.

The coring processor 512 performs a coring process to replace noise having amplitudes less than a predetermined level (coring level) with 0. The coring processor 512 then outputs a video signal subjected to the coring process to the non-linear processor 513. In the coring processor 512, the coring level is determined based on the control signal 103. For example, if the coring level is set to be high based on the control signal 103, the coring process is not performed on noise with a small amplitude, and thus the coring effect is small. On the other hand, if the coring level is set to be low based on the control signal 103, the coring process is performed on noise with a small amplitude, and thus the effect of the coring process performed by the coring processor 512 is high.

The non-linear processor 513 performs non-linear conversion in which the characteristics of input and output (pixel value) change at a predetermined level (non-linear level). For example, the equivalent relationship changes to the relationship where output is moderate. The non-linear processor 513 then outputs a converted video signal to the gain adjuster 514. In the non-linear processor 513, the non-linear level is determined based on the control signal 103. For example, if the non-linear level is set to be low based on the control signal 103, output is moderate with respect to input after the non-linear level. Thus, the effect of the non-linear conversion is small. On the other hand, if the non-linear level is set to be high based on the control signal 103, input and output are in an equivalent relationship up to the non-linear level, and output is moderate with respect to input after the non-linear level. Thus, the effect of the non-linear conversion is high.

The gain adjuster 514 adjusts the gain of an input video signal and outputs the adjusted video signal to the corrector 515. In the gain adjuster 514, the gain adjustment amount is determined based on the control signal 103. For example, if the gain adjustment amount is set to be small based on the control signal 103, the effect of the gain adjustment by the gain adjuster 514 is small. On the other hand, if the gain adjustment amount is set to be large based on the control signal 103, the effect of the gain adjustment by the gain adjuster 514 is high.

The corrector 515 adds a video signal obtained by the process performed on the decoded video signal 102 by the filtering module 511, the coring processor 512, the non-linear processor 513, and the gain adjuster 514 to the decoded video signal 102 to obtain the video signal 110. In other words, the corrector 515 acids a video signal of a predetermined band extracted from the decoded video signal 102 and enhanced to the decoded video signal 102, and outputs it to the difference detector 540 as the video signal 110. Not only adding an enhanced video signal to the decoded video signal 102, also the corrector 515 may perform addition, subtraction, multiplication and division.

The high-resolution image generator 520 estimates an original pixel value from the decoded video signal 102 with a first resolution and increases the pixels to generate the video signal 104 with a second resolution higher than the first resolution. More specifically, the high-resolution image generator 520 adds a parameter 113 generated from a difference between a video signal obtained by enhancing a video signal of a predetermined band contained in the decoded video signal 102 and a video signal of a temporary high-resolution image generated from the decoded video signal 102 to a video signal in which pixels are interpolated based on information on adjacent pixels from the decoded video signal 102, thereby generating the video signal 104. Besides, the high-resolution image generator 520 stores the input decoded video signal 102 in a frame buffer (not illustrated) or the like. When repeating the above comparison and restoration process, the high-resolution image generator 520 outputs the decoded video signal 102 to the temporary high-resolution image generator 530 as a video signal 111. The video signal 111 is output to the difference detector 540 through the temporary high-resolution image generator 530 as a video signal 112.

The difference detector 540 detects the difference between the video signal 110 generated by the enhancement band filter 510 and the video signal 112 generated by the temporary high-resolution image generator 530. The difference detector 540 outputs the detected difference (difference signal) to the coring processor 550. The coring processor 550, the non-linear processor 560, and the parameter adjuster 570 adjust the difference signal detected by one difference detector 540.

The coring processor 550 performs a coring process on the difference signal to replace noise having amplitudes less than a predetermined level (coring level) with 0. The coring processor 512 then outputs a signal subjected to the coring process to the non-linear processor 560. In the coring processor 550, the coring level is determined based on the control signal 103. For example, if the coring level is set to be high based on the control signal 103, the coring process is not performed on noise with a small amplitude, and thus the effect of the coring process performed by the coring processor 550 is small. On the other hand, if the coring level is set to be low based on the control signal 103, the coring process is performed on noise with a small amplitude, and thus the effect of the coring process performed by the coring processor 550 is high.

The non-linear processor 560 performs non-linear conversion in which the characteristics of input and output change at a predetermined level (non-linear level). For example, the equivalent relationship changes to the relationship where output is moderate. The non-linear processor 560 then outputs a converted signal to the parameter adjuster 570. In the non-linear processor 560, the non-linear level is determined based on the control signal 103. For example, if the non-linear level is set to be low based on the control signal 103, output is moderate with respect to input after the non-linear level. Thus, the effect of the non-linear conversion is small. On the other hand, if the non-linear level is set to be high based on the control signal 103, input and output are in an equivalent relationship up to the non-linear level, and output is moderate with respect to input after the non-linear level. Thus, the effect of the non-linear conversion is high.

The parameter adjuster 570 adjusts the gain of an input video signal and outputs the adjusted signal to the high-resolution image generator 520 as the parameter 113. In the parameter adjuster 570, the gain adjustment amount is determined based on the control signal 103. For example, if the gain adjustment amount is set to be small based on the control signal 103, the effect of the gain adjustment by the parameter adjuster 570 is small. On the other hand, if the gain adjustment amount is set to be large based on the control signal 103, the effect of the gain adjustment by the parameter adjuster 570 is high.

With reference to FIGS. 3, 4A, 4B, and 4C, description will be given of the control of the sharpening controller 40 by the sharpening processor 50. FIGS. 3, 4A, 4B, and 4C are conceptual diagrams of sharpening process performed by the sharpening controller 40. As illustrated in FIG. 3, the sharpening controller 40 controls the intensity of the effect of sharpening in the sharpening processor 50 according to the quantization information (quantization step, quantization scale, etc.) indicating the accuracy of quantization of the encoded video signal 101 obtained by the information output module 22, i.e., the level of the accuracy of quantization.

More specifically, if the quantization step and the quantization scale are large and the accuracy of quantization of the encoded video signal 101 is low, the sharpening controller 40 outputs to the sharpening processor 50 the control signal 103 to reduce the effect of the process performed by the coring processors 512 and 550, the non-linear processors 513 and 560, the gain adjuster 514, and the parameter adjuster 570 (increase the coring level, reduce the non-linear level, and reduce the gain). Thus, the sharpening controller 40 reduces the effect of sharpening in the sharpening processor 50 as the total effect of the processes. On the other hand, if the quantization step and the quantization scale are small and the accuracy of quantization of the encoded video signal 101 is high, the sharpening controller 40 outputs to the sharpening processor 50 the control signal 103 to increase the effect of the process performed by the coring processors 512 and 550, the non-linear processors 513 and 560, the gain adjuster 514, and the parameter adjuster 570 (reduce the coring level, increase the non-linear level, and increase the gain). Thus, the sharpening controller 40 increases the effect sharpening in the sharpening processor 50 as the total effect of the processes.

When the quantization step and the quantization scale are large and the accuracy of quantization of the encoded video signal 101 is low, coding distortion is likely to occur. If intense sharpening is performed on a video signal containing a distortion component resulting from the coding distortion, the image quality may degrade. Accordingly, when the accuracy of quantization of toe encoded video signal 101 is low, the effect of sharpening is reduced to prevent the distortion component caused by the coding distortion from being amplified by the sharpening.

As illustrated in FIG. 4A, the sharpening controller 40 controls the intensity of the effect of sharpening in the sharpening processor 50 according to the encoding scheme of the encoded video signal 101. More specifically, in the case of MPEG-2 encoding, the sharpening controller 40 outputs to the sharpening processor 50 the control signal 103 to reduce the effect of the process performed by the coring processors 512 and 550, the non-linear processors 513 and 560, the gain adjuster 514, and the parameter adjuster 570. Thus, the sharpening controller 40 reduces the effect of sharpening in the sharpening processor 50 as the total effect of the processes. On the other hand, in the case of H.264/MPEG-4 AVC encoding, the sharpening controller 40 outputs to the sharpening processor 50 the control signal 103 to increase the effect of the process performed by the coring processors 512 and 550, the non-linear processors 513 and 560, the gain adjuster 514, and the parameter adjuster 570. Thus, the sharpening controller 40 increases the effect of sharpening in the sharpening processor 50 as the total effect of the processes.

The coding distortion is more likely to occur in MPEG-2 encoding than in H.264/MPEG-4 AVC encoding. Accordingly, when MPEG-2 encoding is used, the effect of sharpening is reduced. With this, it is possible to prevent the distortion component caused by the coding distortion from being amplified by the sharpening process.

As illustrated in FIG. 4B, the sharpening controller 40 controls the intensity of the effect of sharpening in the sharpening processor 50 according to the picture type of encoded video sign 101. More specifically, in the case of I-picture, the sharpening controller 40 outputs to the sharpening processor 50 the control signal 103 to reduce the effect of the process performed by the coring processors 512 and 550, the non-linear processors 513 and 560, the gain adjuster 514, and the parameter adjuster 570. Thus, the sharpening controller 40 reduces the effect of sharpening in the sharpening processor 50 as the total effect of the processes. On the other hand, in the case of P-picture and B-picture, the sharpening controller 40 outputs to the sharpening processor 50 the control signal 103 to increase the effect of the process performed by the coring processors 512 and 550, the non-linear processors 513 and 560, the gain adjuster 514, and the parameter adjuster 570. Thus, the sharpening controller 40 increases the effect of sharpening in the sharpening processor 50 as the total effect of the processes.

I-picture is generated singularly from an encoding signal. P-picture is generated using motion compensation prediction in one direction based on difference information between I-picture and P-picture in GOP. B-picture is generated using bilateral prediction based on difference information from preceding and subsequent I-picture or P-picture. Accordingly, in the GOP cycle, a small amplitude difference (noise-detail component) contained in I-picture appears in a video image as periodic flicker. Therefore, if the picture type is I-picture, the effect of sharpening is reduced. With this, it is possible to prevent the periodic flicker from being amplified by the sharpening.

As illustrated in FIG. 4C, the sharpening controller 40 controls the intensity of the effect of sharpening in the sharpening processor 50 according to the frequency histogram of the decoded video signal 102 detected by the histogram detector 30. More specifically, if the decoded video signal 102 represents a field or a frame mainly formed of high-frequency component pixels, the sharpening controller 40 outputs to the sharpening processor 50 the control signal 103 to duce the effect of the process performed by the coring processors 512 and 550, the non-linear processors 513 and 560, the gain adjuster 514, and the parameter adjuster 570. Thus, the sharpening controller 40 reduces the effect of sharpening in the sharpening processor 50 as the total effect of the processes. On the other hand, if the decoded video signal 102 represents a field or a frame mainly formed of low-frequency component pixels, the sharpening controller 40 outputs to the sharpening processor 50 the control signal 103 to increase the effect of the process performed by the coring processors 512 and 550, the non-linear processors 513 and 560, the gain adjuster 514, and the parameter adjuster 570. Thus, the sharpening controller 40 increases the effect of sharpening in the sharpening processor 50 as the total effect of the processes.

In this manner, in the case of a field or a frame mainly formed of high-frequency component pixels, the sharpening controller 40 reduces the effect of sharpening. With this, it is possible to prevent noise contained in high-frequency component from being amplified by the sharpening process.

The sharpening controller 40 outputs the control signal 103 to the sharpening processor 50 according to the conditions of the input encoded video signal 101 (quantization information, encoding scheme, picture type, frequency histogram). The control signal 103 may be obtained by weighting the gain, the non-linear level, and the coring level calculated from quantization information according to other conditions such as encoding scheme, picture type, frequency histogram, and the like. In this case, the sharpening in the sharpening processor 50 can be controlled taking into account other conditions based on the accuracy of quantization of the encoded video signal 101.

When controlling the intensity of the effect of sharpening using quantization information and other conditions (encoding scheme, picture type, frequency histogram), the sharpening controller 40 performs the control according to a condition that reduces the effect. For example, the sharpening controller 40 calculates the coring level, the non-linear level, and the gain with respect to each of the conditions (quantization information, encoding scheme, picture type, frequency histogram) of the input encoded video signal 101. From the values calculated for the conditions, the sharpening controller 40 selects a value resulting in the smallest effect of sharpening (the highest coring level, the lowest non-linear level, and the smallest gain). The sharpening controller 40 may output the value to the sharpening processor 50 as the control signal 103. In this case, from among conditions, the effect of sharpening can be controlled based on a condition corresponding to the large effect of noise or the like.

Figure 6:
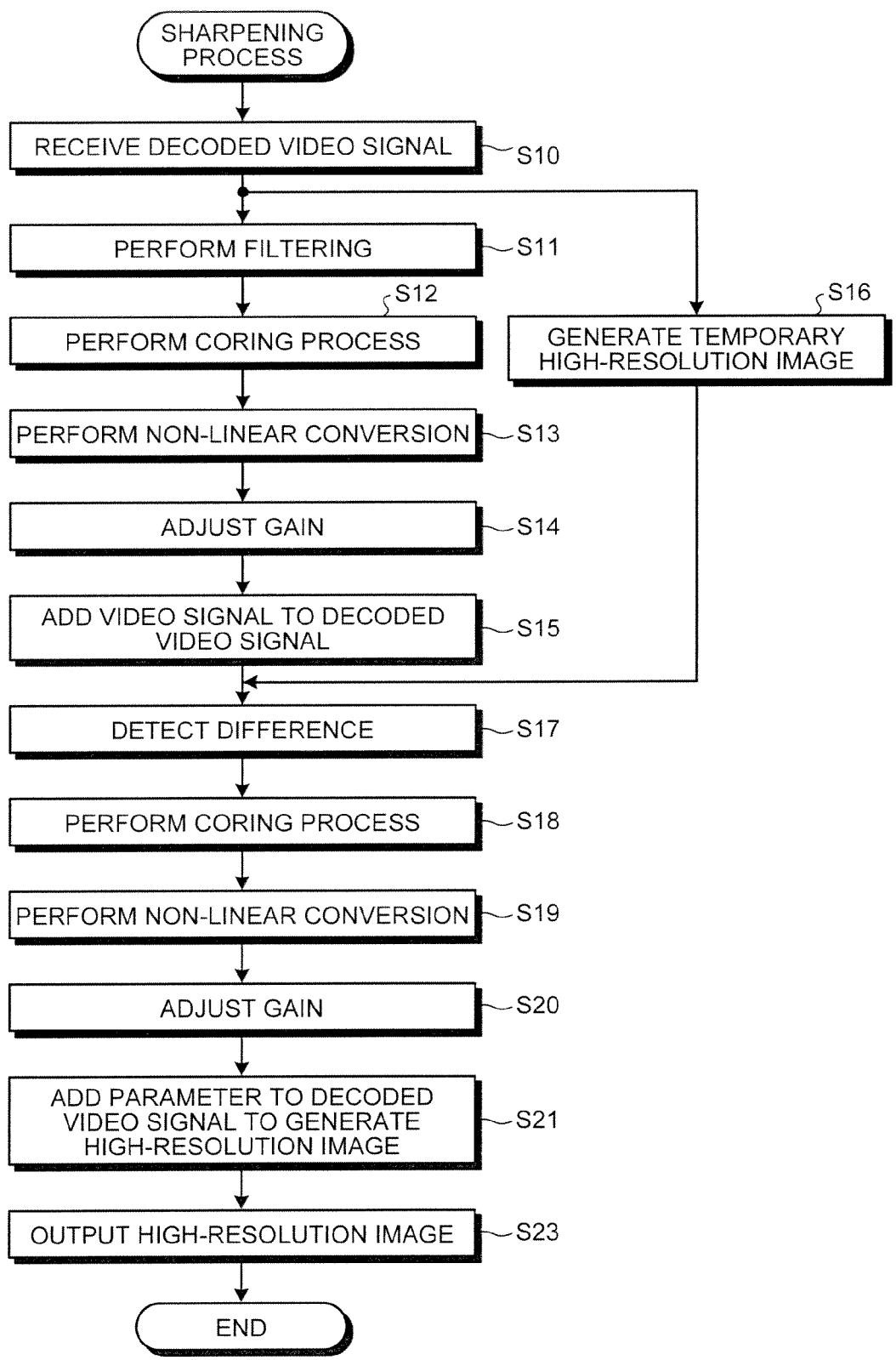
FIG. 6 is an exemplary flowchart of the operation of the sharpening processor in the embodiment.

With reference to FIGS. 5 and 6, a description will be given of the operation of the image processing apparatus 1. FIG. 5 is a flowchart of an example of the operation of the image processing apparatus 1. FIG. 6 is a flowchart of an example of the operation of the sharpening processor 50.

As illustrated in FIG. 5, upon receipt of the encoded video signal 101 (S1), the decoder 10 decodes the encoded video signal 101 encoded by a predetermined encoding scheme (S2). Next, the encoding information acquisition module 20 acquires encoding information and outputs it to the sharpening controller 40 (S3). More specifically, the encoding scheme output module 21 of the encoding information acquisition module 20 outputs the encoding scheme of the encoded video signal 101 to the sharpening controller 40, while the information output module 22 outputs the picture type and the quantization information of the encoded video signal 101 to the sharpening controller 40.

Thereafter, the histogram detector 30 detects a frequency histogram with respect to each field or frame of the decoded video signal 102, and outputs the detected frequency histogram to the sharpening controller 40 (S4). Under the control of the sharpening controller 40, the sharpening processor 50 then performs sharpening on the input decoded video signal 102 to generate the video signal 104 with a resolution higher than that of the decoded video signal 102 (S5). More specifically, the sharpening controller 40 outputs the control signal 103 based on the frequency histogram and the encoding information received from the encoding information acquisition module 20 to the sharpening processor 50. In the sharpening processor 50, sharpening is performed on the decoded video signal 102 according to the control signal 103 to generate the video signal 104. That is, in the sharpening process for the decoded video signal 102, the intensity of the effect of the coring process, the non-linear process, and the gain adjustment is adjusted based on the control signal 103, and thereby the intensity of the effect of sharpening is controlled.

As illustrated in FIG. 6, when the sharpening processor 50 receives the decoded video signal 102 (310), the enhancement band filter 510 enhances a video signal of predetermined band contained in the input decoded video signal 102 (S11 to S15). Then, the enhancement band filter 510 outputs the encoded video signal 101 to the difference detector 540.

More specifically, the filtering module 511 extracts a video signal of a predetermined band from the input decoded video signal 102 (S11). The coring processor 512 performs a coring process on the video signal extracted by the filtering module 511 at a coring level set by the control signal 103 (S12). The non-linear processor 513 performs non-linear conversion on the video signal subjected to the coring process by the coring processor 512 at a non-linear level set by the control signal 103 (S13). The gain adjuster 514 adjusts the gain of the video signal subjected to the non-linear conversion by the non-linear processor 513 by an adjustment amount set by the control signal 103 (S14). After that, the corrector 515 adds the video signal subjected to the gain adjustment by the gain adjuster 514 to the decoded video signal 102 (S15).

In parallel with the process from S11 to S15 by the enhancement band filter 510, the temporary high-resolution image generator 530 performs pixel interpolation based on information on adjacent pixels from the video signal 111 output from the high-resolution image generator 520 to generate a temporary high-resolution image (S16). The temporary high-resolution image generator 530 outputs the video signal 112 the difference detector 540.

Subsequent the process at S15 and S16, the difference detector 540 detects the difference between the video signal 110 generated by the enhancement band filter 510 and the video signal 112 generated by the temporary high-resolution image generator 530. The difference detector 540 outputs a difference signal to the coring processor 550. The coring processor 550 performs a coring process on the difference signal at a coring level set by the control signal 103 (S18). The non-linear processor 560 performs non-linear conversion on the signal subjected to the coring process by the coring processor 550 at a non-linear level set by the control signal 103 (S19). The parameter adjuster 570 adjusts the gain of the signal subjected to the non-linear conversion by the non-linear processor 560 by an adjustment amount set by the control signal 103 (S20). After that, the parameter adjuster 570 outputs the parameter 113 to the high-resolution image generator 520.

The high-resolution image generator 520 adds the parameter 113 generated from a difference between a video signal obtained by enhancing a video signal of a predetermined band contained in the decoded video signal 102 and a video signal of a temporary high-resolution image generated from the decoded video signal 102 to the decoded video signal 102. With this, the high-resolution image generator 520 generates a high-resolution image with a resolution higher than that of an image represented by the decoded video signal 102 (S21). The high-resolution image generator 520 outputs the generated high-resolution image as the video signal 104 (S23).

The process from S10 to S23 is described above as an example of a flow of the sharpening process for one frame, and the process is repeated for each of frames of a video image to sharpen it. While the process from S10 to S23 indicates that the sharpening process is performed once for one frame, the sharpening process may be performed a plurality of times for one frame. For example, the process from S10 to S21 may be repeated until the difference detected by the difference detector 540 becomes predetermined threshold or less. The repetition of sharpening process realizes a highly accurate high-resolution image.

The sharpening process may include a process (super-resolution enhancement), in which, from a video signal with a standard definition (SD) resolution (720×460) or an intermediate resolution (1440×1080), i.e., first resolution, an original pixel value is estimated to increase the pixels and thus to restore a video signal with a high resolution (for example, HD resolution), i.e., second resolution higher than the first resolution.

The original pixel value refers to the value of each pixel of a video signal obtained by, for example, photographing the same object as that of an image with the first resolution with a camera capable of capturing an image with the second resolution.

Besides, "original pixel value is estimated to increase pixels" means to obtain the characteristics of images to find a correlated image, and estimate an original pixel value from neighboring images (in the same frame or between frames) using the correlated image to increase pixels.

More specifically, a temporary high-resolution image (the second resolution) is generated from an original input image (the first resolution) by up-conversion (scaling). That is, a pixel is interpolated based on information on adjacent pixels to generate a temporary high-resolution image. In parallel to the generation of the temporary high-resolution image, the input image is sharpened using an unsharp mask to enhance a video signal of a predetermined band contained in the input signal.

The pixel interpolated in the temporary high-resolution image does not always correspond to the original input image. Consequently, noise or edge distortion may occur. In other words, the temporary high-resolution image has a portion different from the image obtained by enhancing a video signal of a predetermined band contained in the input signal. Accordingly, a temporary low-resolution image is generated by down-converting the temporary high-resolution image and is compared with the input image to detect a difference as the different portion. The different portion is corrected based on information on adjacent pixels not to make a calculation error. Thus, an output image similar to the original input image is generated by the super-resolution enhancement.

That is, the super-resolution enhancement refers to a technology to compare a temporary low-resolution image generated by down-converting a temporary high-resolution image with an original input image enhanced using an unsharp mask and restore a video signal that the original input image is supposed to have. As the comparison and the restoration are repeated more times, the accuracy of the super-resolution enhancement increases. Accordingly, the super-resolution enhancement includes the comparison and the restoration performed once and a plurality of repetitions of the comparison and the restoration. If there is enough time, for example, when recorded video is viewed or a time lag in the super-resolution enhancement is allowed, the super-resolution enhancement where the comparison and the restoration are repeated a plurality of times is available.

The super-resolution enhancement is not limited to the process as described above. While a process, in which an original pixel value is estimated from a video signal with a low or intermediate resolution to increase the pixels to thereby restore a video signal with a high resolution, is described above by way of example, the super-resolution enhancement may be performed in any other manners. The super-resolution enhancement includes a process in which the resolution histogram of video is analyzed and optimal high-image quality process is performed according to the resolution. For example, the super-resolution enhancement includes sharpening corresponding to a resolution (for example, a resolution of 1920×1080) obtained by analyzing the resolution histogram of video of a video signal received with the HD resolution (1920×1060). In this case, although the resolution does not change by the super-resolution enhancement, the viewer feels that the resolution of video increases.

Figure 7:
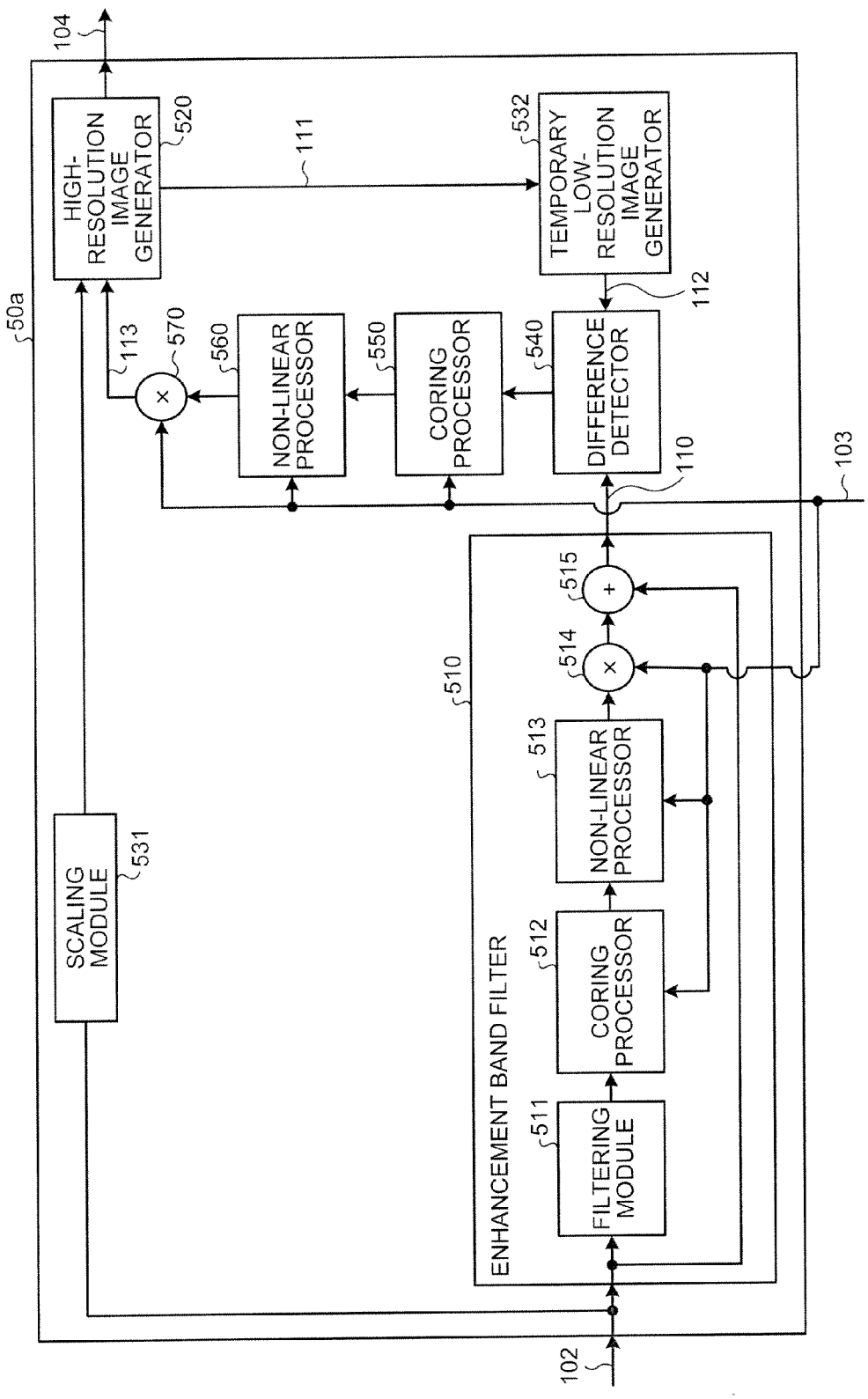
FIG. 7 is an exemplary block diagram, of a sharpening processor in the embodiment.

A description will be given of a configuration of a sharpening processor that performs the super-resolution enhancement. FIG. 7 is a block diagram a sharpening processor 50*a* in the embodiment. FIG. 7 illustrates a configuration of the sharpening processor 50*a* that performs the super-resolution enhancement. As illustrated in FIG. 7, differently from the sharpening processor 50, the sharpening processor 50*a* comprises a scaling module 531 at the former stage of the high-resolution image generator 520 and a temporary low-resolution image generator 532 in place of the temporary high-resolution image generator 530.

The scaling module 531 up-converts the decoded video signal 102, and outputs it to the high-resolution image generator 520. The temporary low-resolution image generator 532 down-converts the video signal 111 output from the high-resolution image generator 520 to generate a low-resolution image. The generated low-resolution image is output to the difference detector 540 as the video signal 112.

Figure 8:
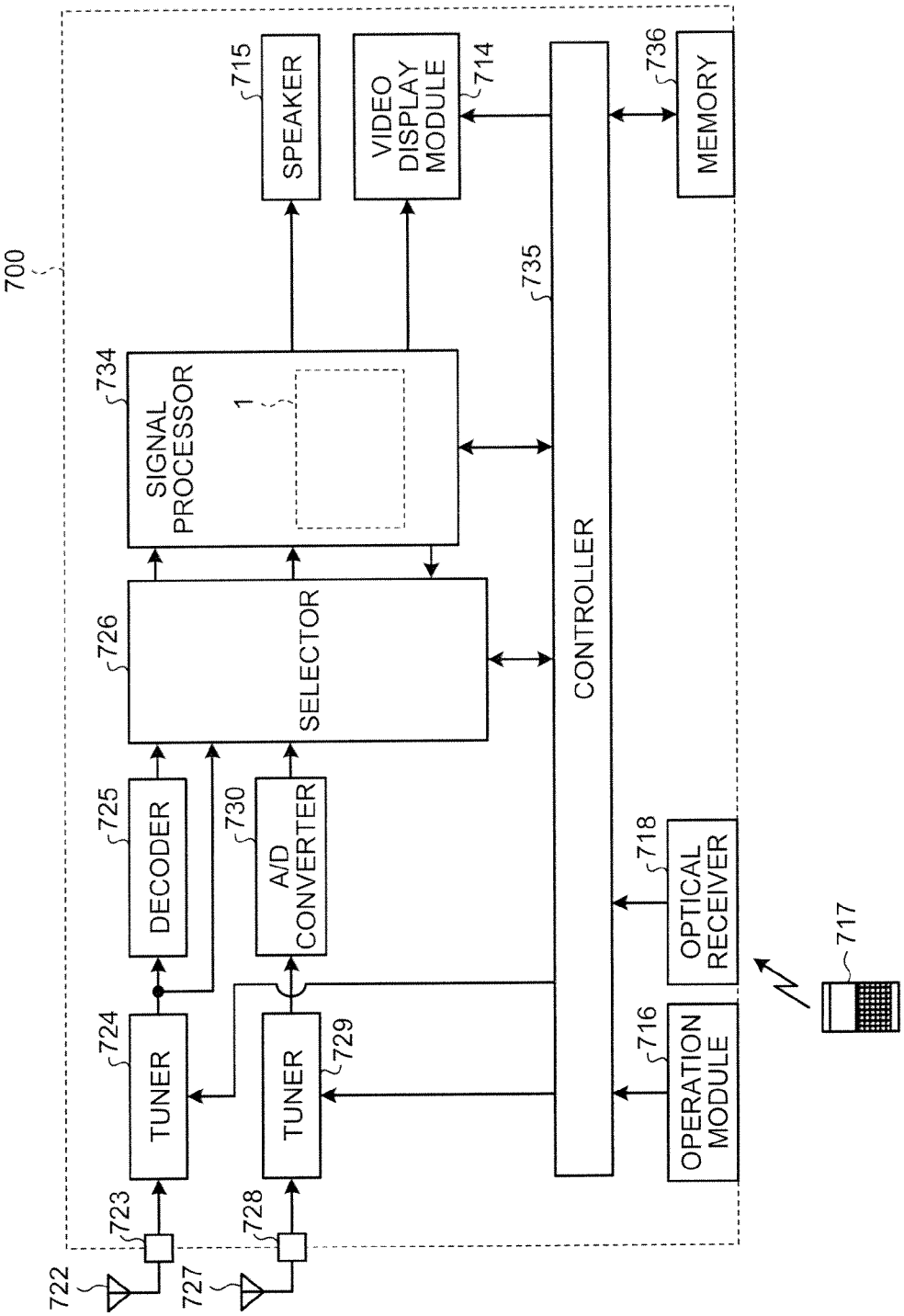
FIG. 8 is an exemplary block diagram of a television broadcast receiver provided with the image processing apparatus in the embodiment.

With reference to FIG. 8, a description will be given of an example in which the image processing apparatus 1 is applied to a TV broadcast receiver. FIG. 8 is a block diagram of a TV broadcast receiver 700 comprising the image processing apparatus 1.

As illustrated in FIG. 8, the image processing apparatus 1 described referring to FIG. 1 is provided in a signal processor 734 of the TV broadcast receiver 700. In the TV broadcast receiver 700, a digital TV broadcast signal received by an antenna 722 for receiving digital TV broadcast is supplied to a tuner 724 via an input terminal 723. The tuner 724 selects a signal of a desired channel from input digital TV broadcast signals and demodulates the signal.

The output of the tuner 724 is decoded by a decoder 725 as well as being directly supplied to a selector 726. The selector 726 separates video/audio data from the signal. The video/audio data obtained by the selector may be stored in HDD through a controller 735.

An analog TV broadcast signal received by an antenna 727 for receiving analog TV broadcast is supplied to a tuner 729 via an input terminal 728. The tuner 729 selects a signal of a desired channel from input analog TV broadcast signals and demodulates the signal. The signal output from the tuner 729 is digitalized by an analog-to-digital (A/D) converter 730 and supplied to the selector 726.

The selector 726 selects one of the two types of input digital video and audio signals and outputs the selected signal to the signal processor 734. The signal processor 734 performs predetermined signal processing on the input digital video signal and displays it on a video display module 714. The video display module 714 may be, for example, a flat panel display such as liquid crystal display (LCD), plasma display, and the like. The signal processor 734 also performs predetermined signal processing on the input digital audio signal to convert it to an analog signal and outputs it to a speaker 715 to reproduce the sound.

The controller 735 controls the overall operation of the TV broadcast receiver 700 including receiving operation. The controller 735 is a microprocessor comprising a built-in CPU or the like. The controller 735 controls each module in response to operational information received by an operation module 716 such as an operation key or operational information sent from a remote controller 717 and received through an optical receiver 718 so that the operational information is reflected to the operation of the TV broadcast receiver 700. In this case, the controller 735 uses a memory 736. The memory 736 mainly comprises a ROM that stores a control program executed by the CPU, a RAM that provides the CPU with a work area, and a nonvolatile memory that stores various types of setting information and control information.

While the sharpening processor 50 is described by way of example as performing the coring process, the non-linear process, and the gain adjustment on a video signal in this order (the coring processor 512→the non-linear processor 513→the gain adjuster 514, or the coring processor 550→the non-linear processor 560→the parameter adjuster 570), it is not so limited. The sharpening processor 50 may perform the coring process, the non-linear process, and the gain adjustment in any order and, for example, may perform the processes in the order of the non-linear process, the coring process, and the gain adjustment.

In the control of sharpening exemplified in FIGS. 3, 4A, 4B, and 4C, the intensity of the effect of sharpening may be controlled by controlling at least one of the coring process, the non-linear process, and the gain adjustment according to each condition. For example, as the quantization accuracy decreases, at least one of increasing the coring level, reducing the non-linear level, and reducing the adjustment amount of the gain may be performed.

In the control of sharpening exemplified in FIGS. 3, 4A, 4B, and 4C, the intensity of the effect of sharpening may be controlled according to conditions such as the quantization step, the encoding scheme, the picture type, and the like. For example, if the quantization step is large, it is only required to reduce the effect of sharpening as a result. That is, it is not necessary to control all the coring process, the non-linear process, and the gain adjustment to reduce the effect of sharpening. If the coring is set to be low when the quantization step is large and increases the effect of sharpening, the effect of sharpening results in being reduced by controlling the non-linear process (non-linear conversion) and the gain adjustment to reduce the effect of sharpening. In addition, while the above process is described by way of example as being performed on a field or a frame of a video image (moving image), if the encoded image is a still image, the same process may be performed on the still image.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An image processing apparatus comprising:
a processor configured to function as:
a decoder configured to decode an encoded image to obtain a decoded image;
an acquisition module configured to acquire quantization information indicating accuracy of quantization upon generating the encoded image;
a sharpening module configured to perform sharpening on the decoded image;
a detector configured to detect a frequency histogram indicating existing pixels corresponding to each frequency component of the decoded image with respect to the decoded image; and
a controller configured to control effect of the sharpening based on the quantization information such that the effect of the sharpening is reduced as the accuracy decreases, and to control the effect of the sharpening such that the effect of the sharpening is reduced for a decoded image containing a larger number of high-frequency component pixels based on the frequency histogram.

2. The image processing apparatus of claim 1, wherein the sharpening module comprises:
an unsharp mask configured to enhance a video signal of a predetermined band contained in the decoded image;
a temporary high-resolution image generator configured to generate, from the decoded image, by performing pixel interpolation based on information in adjacent pixels, a temporary high-resolution image with a resolution higher than a resolution of the decoded image;
a difference detector configured to detect a difference between an image generated by the unsharp mask and the temporary high-resolution image;
an adjuster configured to adjust the difference; and
a high-resolution image generator configured to add the difference adjusted by the adjuster to the decoded image to generate a high-resolution image with a resolution higher than the resolution of the decoded image, wherein
the controller is configured to reduce effect of the unsharp mask and the adjuster as the accuracy decreases, and to control the effect of the sharpening as the total effect of the effect of the unsharp mask and the adjuster, such that the effect of the sharpening is reduced.

3. The image processing apparatus of claim 2, wherein
the unsharp mask and the adjuster are configured to perform coring process to remove noise at or below a predetermined coring level, non-linear process to change characteristics of input and output at a predetermined non-linear level, and gain adjustment, and
the controller is configured to perform at least one of increasing the coring level, reducing the non-linear level, and reducing a gain adjustment amount as the accuracy decreases.

4. The image processing apparatus of claim 1, wherein the sharpening includes super-resolution enhancement.

5. The image processing apparatus of claim 1, wherein
the quantization information is a quantization step in a field or a frame, and
the controller is configured to control the effect of the sharpening such that the effect of the sharpening is reduced as the quantization step increases.

6. The image processing apparatus of claim 1, wherein
the quantization information is an average macroblock quantization scale in a field or a frame, and
the controller is configured to control the effect of the sharpening such that the effect of the sharpening is reduced as the average macroblock quantization scale increases.

7. The image processing apparatus of claim 1, wherein
the acquisition module is configured to acquire an encoding scheme upon generating the encoded image, and
the controller is configured to control the effect of the sharpening according to the encoding scheme.

8. The image processing apparatus of claim 7, wherein
the acquisition module is configured to acquire a picture type upon generating the encoded image, and
the controller is configured to control the effect of the sharpening according to the picture type.

9. The image processing apparatus of claim 8, wherein the controller is configured to control the effect of the sharpening based on one of the quantization information, the frequency histogram, the encoding scheme, and the picture type that reduces the effect more than another.

10. An image processing method applied to an image processing apparatus configured to decode an encoded image and sharpen the image, the image processing method comprising:
a decoder decoding the encoded image to obtain a decoded image;
an acquisition module acquiring quantization information indicating accuracy of quantization upon generating the encoded image;
a sharpening module performing sharpening on the decoded image;
a detector detecting a frequency histogram indicating existing pixels corresponding to each frequency component of the decoded image with respect to the decoded image; and
a controller controlling effect of the sharpening based on the quantization information such that the effect of the sharpening is reduced as the accuracy decreases, and controlling the effect of the sharpening such that the effect of the sharpening is reduced for a decoded image containing a larger number of high-frequency component pixels based on the frequency histogram.

* * * * *